(12) United States Patent
Lee et al.

(10) Patent No.: US 9,177,499 B2
(45) Date of Patent: Nov. 3, 2015

(54) METHOD AND SYSTEM FOR PREDICTION OF GAMMA CHARACTERISTICS FOR A DISPLAY

(75) Inventors: Bongsun Lee, La Crescenta, CA (US); Ingo Tobias Doser, Donaueschingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 852 days.

(21) Appl. No.: 12/451,398

(22) PCT Filed: May 22, 2007

(86) PCT No.: PCT/US2007/012144
§ 371 (c)(1),
(2), (4) Date: Nov. 10, 2009

(87) PCT Pub. No.: WO2008/143618
PCT Pub. Date: Nov. 27, 2008

(65) Prior Publication Data
US 2011/0109652 A1     May 12, 2011

(51) Int. Cl.
*G09G 5/10* (2006.01)
*G09G 3/20* (2006.01)
*H04N 5/202* (2006.01)

(52) U.S. Cl.
CPC ............. *G09G 3/2092* (2013.01); *H04N 5/202* (2013.01); *G09G 2320/0673* (2013.01)

(58) Field of Classification Search
CPC ................ G09G 2/2092; G09G 2320/0673
USPC ............ 345/76–102, 589, 690–692; 348/615, 348/607, 797, 673, 674, 677, 687, 777; 315/169.1–169.4
See application file for complete search history.

(56) References Cited

U.S. PATENT DOCUMENTS

| 4,489,349 | A | 12/1984 | Okada | |
|---|---|---|---|---|
| 6,232,954 | B1 | 5/2001 | Rozzi | |
| 6,459,425 | B1 * | 10/2002 | Holub et al. | 345/207 |
| 6,603,450 | B1 * | 8/2003 | Yamazaki et al. | 345/75.2 |
| 6,961,035 | B2 * | 11/2005 | Endo et al. | 345/87 |
| 6,990,249 | B2 * | 1/2006 | Nomura | 382/254 |
| 7,034,895 | B2 * | 4/2006 | Okunuki et al. | 348/673 |
| 7,295,703 | B2 | 11/2007 | Bala et al. | |

(Continued)

FOREIGN PATENT DOCUMENTS

| EP | 1662477 | 5/2006 |
|---|---|---|
| JP | 646252 | 2/1994 |

(Continued)

OTHER PUBLICATIONS

Search Report dated Mar. 31, 2008.

(Continued)

*Primary Examiner* — Prabodh M Dharia
(74) *Attorney, Agent, or Firm* — Robert D. Shedd; Lily Neff

(57) ABSTRACT

A method and system for gamma adjustment for average power level dependency displays includes applying gamma controlled functions over a range of values at a plurality of average power levels (APLs) for a display. The gamma controlled functions include coefficients for reconstruction of the gamma controlled functions. Upon a change to an APL, interpolation is performed between the coefficients to predict a new gamma controlled function for the new APL.

19 Claims, 10 Drawing Sheets

(56) References Cited

U.S. PATENT DOCUMENTS

| | | | |
|---|---|---|---|
| 7,327,333 B2 * | 2/2008 | Joo et al. | 345/63 |
| 7,728,845 B2 * | 6/2010 | Holub | 345/589 |
| 7,783,096 B2 * | 8/2010 | Chen et al. | 382/128 |
| 7,800,559 B2 | 9/2010 | Weitbruch et al. | |
| 7,903,050 B2 * | 3/2011 | Kimura et al. | 345/63 |
| 8,094,107 B2 * | 1/2012 | Nishimura et al. | 345/89 |
| 2002/0003903 A1 | 1/2002 | Engeldrum et al. | |
| 2002/0039030 A1 | 4/2002 | Khazei | |
| 2002/0041287 A1 | 4/2002 | Engeldrum et al. | |
| 2002/0063694 A1 | 5/2002 | Keely, Jr. et al. | |
| 2002/0080168 A1 | 6/2002 | Hilliard et al. | |
| 2002/0120781 A1 | 8/2002 | Hirashima et al. | |
| 2002/0126135 A1 | 9/2002 | Ball et al. | |
| 2002/0158825 A1 * | 10/2002 | Endo et al. | 345/87 |
| 2002/0161835 A1 | 10/2002 | Ball et al. | |
| 2003/0020703 A1 * | 1/2003 | Holub | 345/207 |
| 2003/0025688 A1 | 2/2003 | Cottone et al. | |
| 2003/0048264 A1 | 3/2003 | Cottone et al. | |
| 2003/0091230 A1 | 5/2003 | Choi et al. | |
| 2003/0112378 A1 * | 6/2003 | Okunuki et al. | 348/777 |
| 2003/0120503 A1 | 6/2003 | Davidson et al. | |
| 2003/0125566 A1 | 7/2003 | Braun | |
| 2004/0125049 A1 | 7/2004 | Weitbruch et al. | |
| 2004/0208138 A1 * | 10/2004 | Hayashi et al. | 370/286 |
| 2004/0246537 A1 | 12/2004 | Ohyama et al. | |
| 2005/0021258 A1 | 1/2005 | Fasciano | |
| 2005/0036053 A1 | 2/2005 | Marcu | |
| 2005/0040770 A1 * | 2/2005 | Kang et al. | 315/169.4 |
| 2005/0052354 A1 * | 3/2005 | Chae et al. | 345/60 |
| 2005/0057449 A1 * | 3/2005 | Son | 345/60 |
| 2005/0073616 A1 * | 4/2005 | Joo et al. | 348/797 |
| 2005/0099431 A1 | 5/2005 | Herbert et al. | |
| 2005/0242741 A1 * | 11/2005 | Shiota et al. | 315/112 |
| 2005/0275911 A1 | 12/2005 | Yamada et al. | |
| 2006/0007240 A1 | 1/2006 | Herbert et al. | |
| 2006/0061842 A1 | 3/2006 | Oka et al. | |
| 2006/0093208 A1 | 5/2006 | Li et al. | |
| 2006/0119561 A1 | 6/2006 | Hasegawa | |
| 2007/0055143 A1 | 3/2007 | Deroo et al. | |
| 2007/0085910 A1 | 4/2007 | Anderle et al. | |
| 2007/0120792 A1 * | 5/2007 | Sasaki et al. | 345/89 |
| 2007/0121423 A1 | 5/2007 | Rioux | |
| 2007/0196007 A1 * | 8/2007 | Chen et al. | 382/131 |
| 2007/0216616 A1 * | 9/2007 | Stessen et al. | 345/84 |
| 2007/0247409 A1 * | 10/2007 | Nishimura et al. | 345/89 |
| 2008/0068359 A1 * | 3/2008 | Yoshida et al. | 345/204 |
| 2008/0266321 A1 * | 10/2008 | Aufranc et al. | 345/626 |
| 2009/0002555 A1 * | 1/2009 | Barnhoefer et al. | 348/554 |
| 2009/0174638 A1 * | 7/2009 | Brown et al. | 345/88 |
| 2010/0061694 A1 | 3/2010 | Lee | |
| 2010/0128057 A1 | 5/2010 | Doser et al. | |
| 2010/0201667 A1 | 8/2010 | Lee et al. | |
| 2010/0265264 A1 | 10/2010 | Doser et al. | |
| 2010/0289835 A1 * | 11/2010 | Holub | 345/690 |
| 2011/0109652 A1 | 5/2011 | Lee et al. | |

FOREIGN PATENT DOCUMENTS

| | | |
|---|---|---|
| JP | 08317250 | 11/1996 |
| JP | 2004070119 | 3/2004 |
| JP | 2004070327 | 3/2004 |
| JP | 2004320632 | 11/2004 |
| JP | 2005338451 | 12/2005 |
| JP | 2006093753 | 4/2006 |
| JP | 2006162728 | 6/2006 |
| WO | WO2004105402 | 12/2004 |

OTHER PUBLICATIONS

Office Actions for U.S. Appl. No. 12/452,131 dated Oct. 3, 2012; Jul. 19, 2013; Mar. 7, 2014 and Sep. 9, 2014.

* cited by examiner

METHOD AND SYSTEM FOR PREDICTION OF GAMMA CHARACTERISTICS FOR A DISPLAY

This application claims the benefit, under 35 U.S.C. §365 of International Application PCT/US2007/012,144, filed 22 May 2007, which was published in accordance with PCT Article 21(2) on 27 Nov. 2008, in English.

TECHNICAL FIELD

The present invention generally relates to display technology, and more particularly, to a method and system for predicting gamma characteristics for a display system with average power level dependency.

BACKGROUND

Certain flat panel displays (e.g. Plasma TVs) have dynamic behavior which changes according to input content. This dynamic behavior occurs especially with regard to gamma characteristics. For displays in general, gamma is the exponent that defines the proportionality between light intensity (luminance) and input voltage or digital input value. That is, the intensity produced by a display is proportional to the input voltage or digital input value raised to the power gamma. The value of gamma varies depending on the display. For displays with dynamic behavior or average power level dependency, gamma characteristics are varied depending on the level of power of the content, thereby making it difficult to perform a general gamma correction.

A conventional method of characterizing a display is to measure patches on the display using a spectroradiometer. For the gamma characteristic, a series of patches are measured. Such a procedure is referred to as a ramp (e.g., a gray ramp): (Red, Green, Blue)=(0, 0, 0), (32, 32, 32), (64, 64, 64), . . . , (224, 224, 224), (255, 255, 255). After the measurement, a gamma curve can be plotted. FIG. 1 depicts a luminance value plotted against a digital value for a typical gamma curve (gamma=2.5). The gamma derived from the plot is applied to compensate for a mismatch with a gamma of content input to the display device. However, this characterization of gamma is only for a display with a fixed average power/picture level (APL), and it does not necessarily represent the gamma for other APL settings. The gamma characteristics can be measured for other settings, but this is limiting since additional measurements are needed and the number of additional measurements may be large (i.e., a plurality of APLs).

Even further, flat panel displays often show dynamic features such as dynamic contrast and dynamic APL. Such advanced processing helps the displays produce more enhanced image quality because brightness, contrast, and gammas are adapted to the input content in real time. From a calibration point of view, applying one calibration derived for a given level (e.g., fixed APL) to another level of display state may not work due to discrepancies in display characteristics among different levels (i.e., display behavior changes dynamically according to average power/picture levels of the input content.

SUMMARY

A method and system in accordance with the present principles provide an accurate estimate of the gammas for arbitrary APL.

In one embodiment of the present invention, a system and method for gamma adjustment for average power level dependency displays include programming gamma controlled functions over a range of values at a plurality of average power levels (APLs) for a display. The gamma controlled functions include coefficients for reconstruction of the gamma controlled functions. Upon a change to the APL, interpolation is performed between the coefficients to predict a new gamma controlled function for a new APL.

In an alternate embodiment of the present invention, a method for gamma prediction for average power level dependency displays includes measuring gamma controlled functions over a range of values at a plurality of average power levels (APLs) for a display. Basis vectors and coefficients are determined for the gamma controlled functions. Upon a change to the APL, interpolation between the coefficients is performed to predict a new gamma controlled function for a new APL.

In an alternate embodiment of the present invention, a display device in accordance with the present principles includes a screen configured to display input content at an average power level. A memory is configured to store coefficients and basis vector functions for reconstruction gamma curves for a plurality of arbitrary average power levels (APLs). A sensor is configured to determine when a change to the APL has occurred or to sense a new APL. A processor is configured to be responsive to the sensor to interpolate between the stored coefficients for the plurality of arbitrary average power levels (APLs) to provide a new gamma curve in accordance with the new APL.

BRIEF DESCRIPTION OF THE DRAWINGS

The teachings of the present invention can be readily understood by considering the following detailed description in conjunction with the accompanying drawings, in which.

Figure 1:
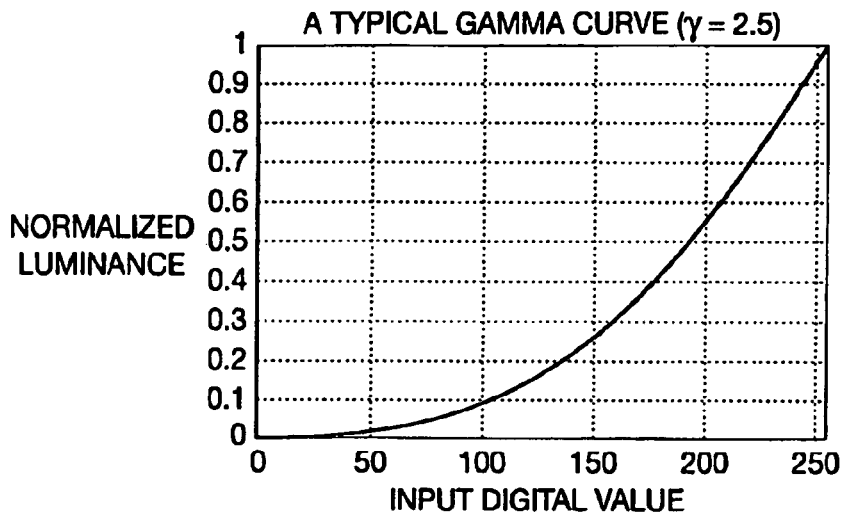
FIG. 1 depicts an exemplary gamma curve.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF PREFERRED EMBODIMENTS

The present invention advantageously provides a method and system for predicting gamma characteristics. The present embodiments are particularly useful for predicting gamma characteristics in displays that have average power (or picture) level dependencies. A novel method and system provide accurate prediction of the gamma characteristics of a display system which are driven by different power levels according to input content. The present embodiments find a correct gamma curve for a given average power level (APL). Gamma is then calculated as the display APL changes. Advantageously, a more adapted gamma correction is applied to the change of the APL on the display to remove the APL dependency.

Although the present embodiments will be illustratively described within the context of gamma adjustment, the specific embodiments of the present invention should not be treated as limiting the scope of the invention. It will be appreciated by those skilled in the art and informed by the teachings of the present invention that the concepts of the present invention can be advantageously applied in adjusting other display parameters as well. For example, the concepts of the present invention can be applied to transfer functions or other non-linear parameters employed in display technologies.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

Figure 3:
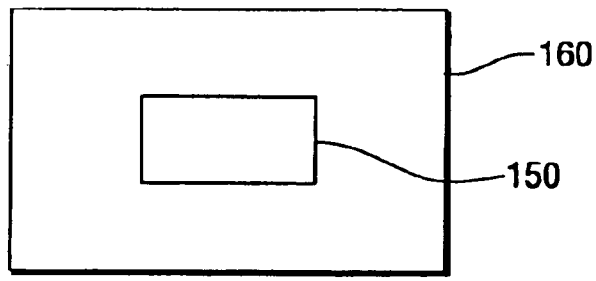
FIG. 3 depicts a patch on a display which represents about a 15% APL on the display in accordance with an embodiment of the present invention.
Figure 2:
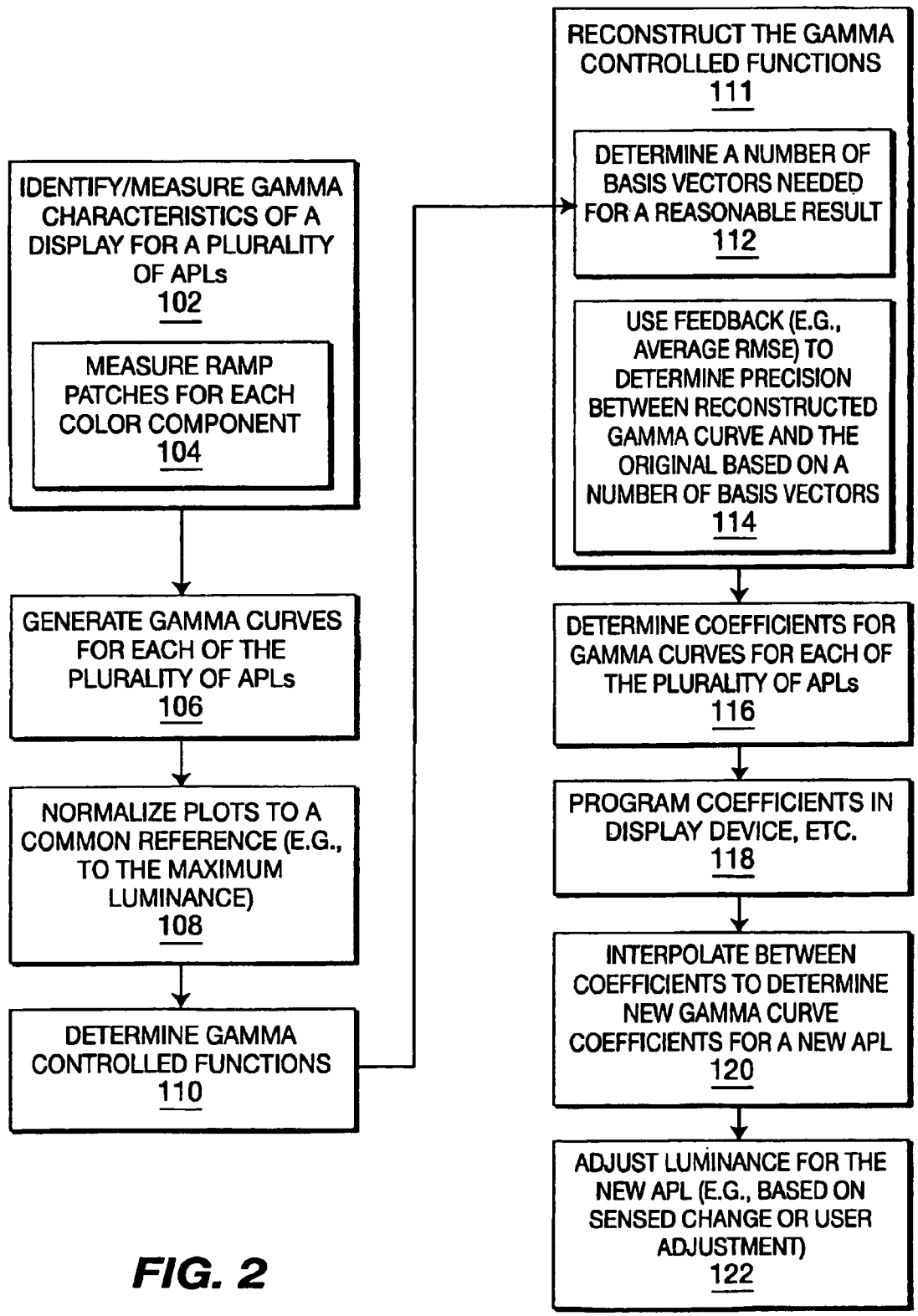
FIG. 2 depicts a flow diagram of a method for determining an average power level in accordance with an embodiment of the present invention.

Referring now in specific detail to the drawings in which like reference numerals identify similar or identical elements throughout the several views, FIG. 2 depicts a flow diagram of a method for determining an average power level in accordance with an embodiment of the present invention. The method 200 of FIG. 2 begins in block 102 at which a gamma characteristic of a display is identified and/or measured for a plurality of average power levels (APLs). In accordance with embodiments of the present invention, the measurements can be performed in a number of ways. In one embodiment, ramp patches are measured for each channel (e.g., red (R), green (G), blue (B)) at a number of different APLs as depicted in block 104. In one example, the number of APLs measured is ten although any number of APLs can be measured and made available. The APL can be defined as the size of a patch centered on a display screen since the size is related with the driving power level of the display. For example, FIG. 3 depicts a patch 150 on a display 160 which represents about a 15% APL on the display 160. Several gamma curves are measured by varying the size of the patches, for example, varying the APL to 10%, 20%, 30%, . . . , 100% APL. It should be noted that as the size of the patch 150 gets larger (APL percentage getting larger), the overall luminance gets smaller. This is a typical characteristic of currently available flat-panel displays, for example. The method 200 then proceeds to step 106.

Figure 4:
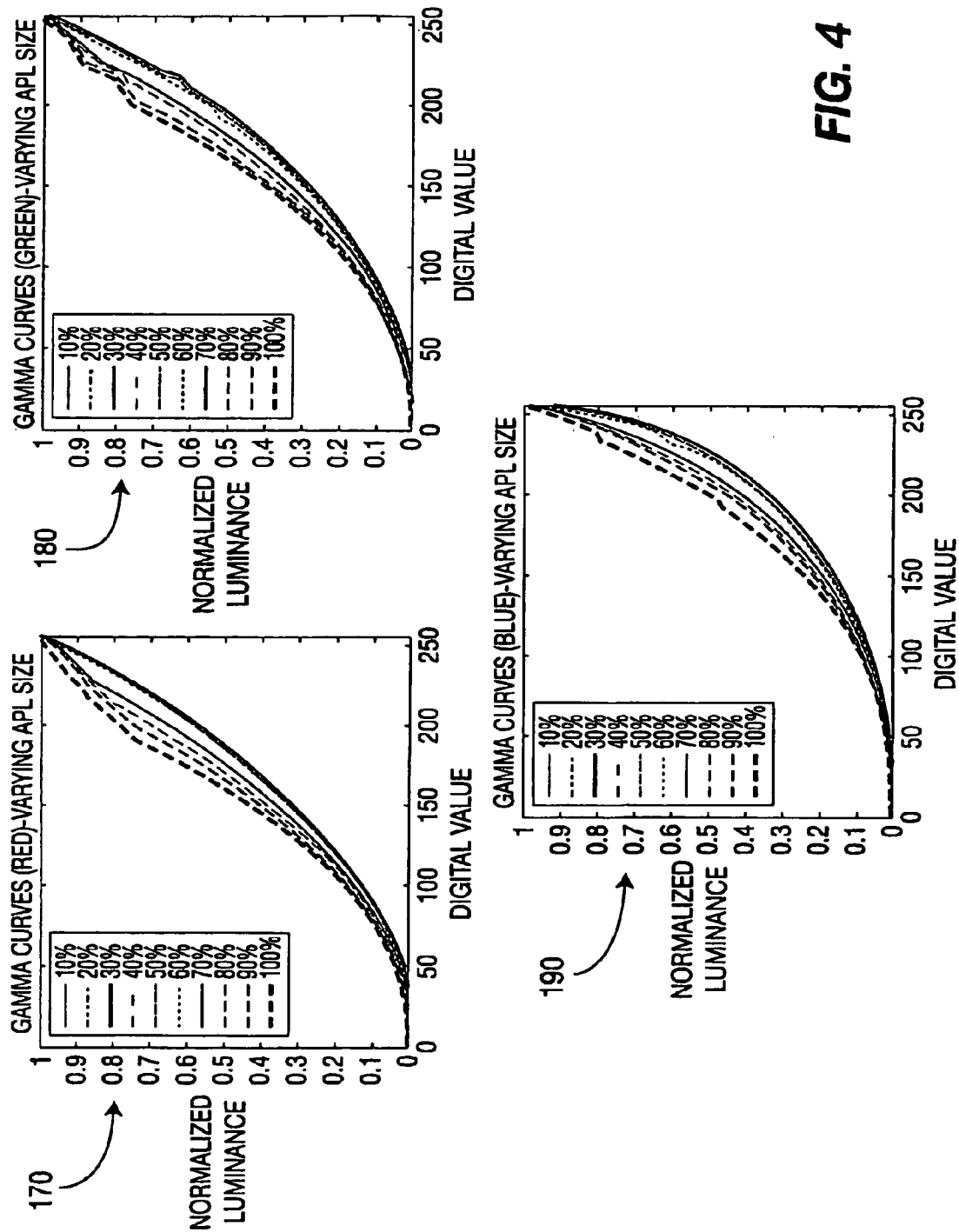
FIG. 4 depicts individual plots for each color component or channel illustrating a plurality of gamma curves determined for the different APLs in accordance with an embodiment of the present invention.

At step 106, gamma curves are generated for the measured APLs. For example, FIG. 4 depicts three plots 170, 180 and 190 in accordance with an embodiment of the present invention. Each plot corresponds to a different color channel (R, G and B, respectively). Each plot includes ten gamma curves which were measured at ten different APLs (10%, 20% . . . 100%). Each curve was normalized by its own maximum luminance, respectively. The method 200 then proceeds to step 108.

Figure 5:
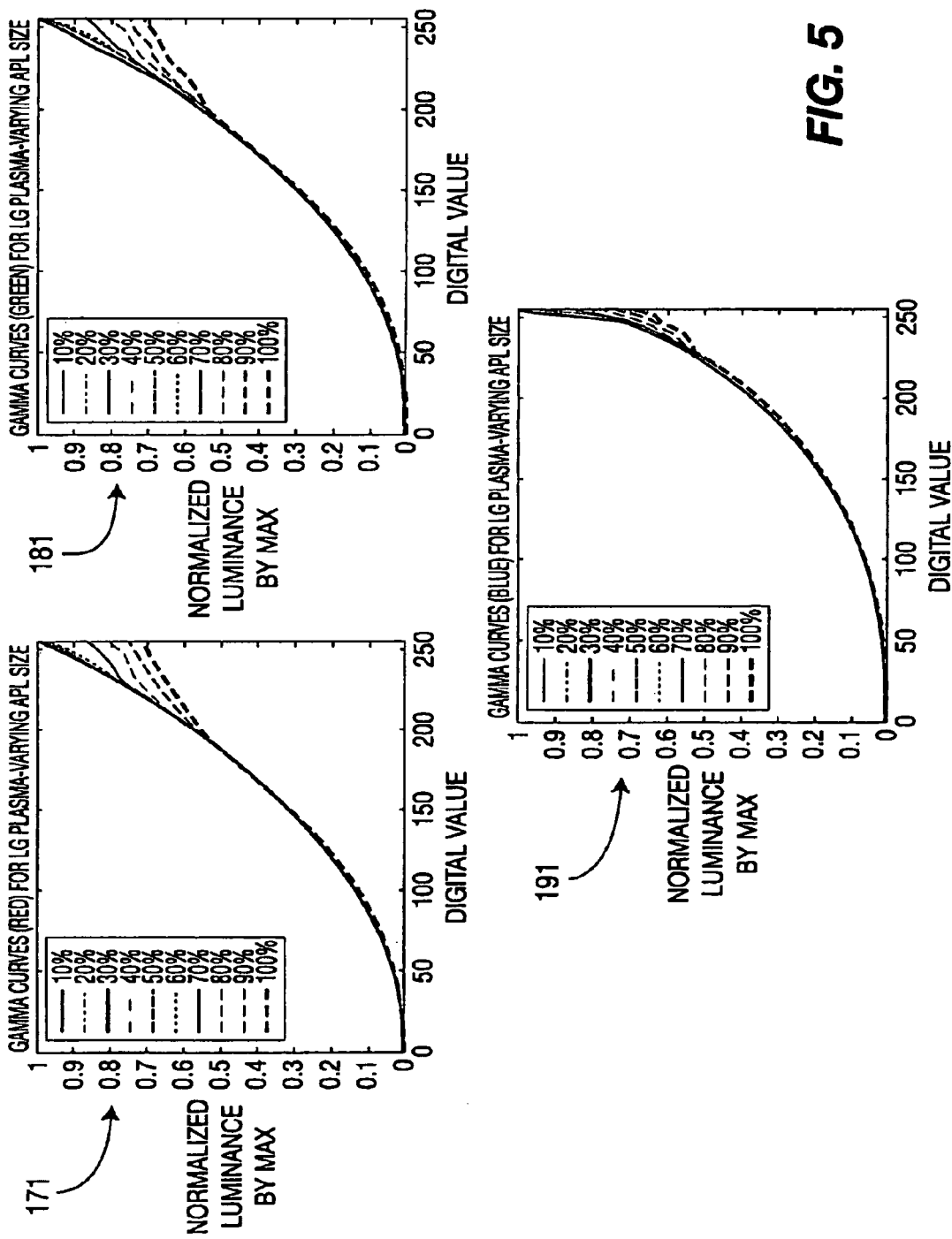
FIG. 5 depicts the plots of FIG. 4 normalized to the maximum luminance level of 10% APL, the maximum luminance level of the plots of FIG. 4.

At step 108, the gamma plots are normalized to a common reference. For example, in one embodiment, the gamma plots are normalized to the first or lowest APL (corresponding to the largest luminance for a given channel) for each APL of for example plots 170, 180 and 190. FIG. 5 depicts plots 171, 181 and 191 which are normalized versions of plots 170, 180 and 190, normalized at the maximum luminance of 10% APL (the largest luminance value for the selected APL's of FIG. 4). Normalization is performed to determine the behavior of different gamma characteristics for the different APLs and then derive the most appropriate methodology to compensate for the differences (described in further detail below). That is, normalization assists in simplification of the method of the present invention. The method 200 then proceeds to step 110.

At step 110, gamma controlled functions (gamma curves) are analyzed to determine an analytical function for each curve. For example, in one embodiment, a Principle Component Analysis (PCA) can be implemented to analyze the ten curves for each channel and extract eigen vectors as basis vectors (V) and corresponding coefficients (C) for the ten curves. PCA is a useful statistical technique that has found application in finding patterns in data. Using statistical analysis, matrices of the data in the graphs of FIG. 5 are used to determine eigen vectors. The eigen vectors are extracted. The method then proceeds to step 111.

At step 111, each of the ten curves can be reconstructed using the coefficient associated with the basis vectors. For example, the reconstruction using only two basis vectors can be characterized according to equation one (1), which follows:

$$Gr(d)=C_1V_1(d)+C_2V_2(d), \quad (1)$$

where Gr depicts the reconstructed gamma function as a function of digital values (d), $V_1$, $V_2$ are two basis vectors, and $C_1$, $C_2$ are corresponding coefficients. An analog version is also contemplated. For example and as depicted in step 112, the number of basis vectors required for reconstruction can be determined. In general, the more vectors used, the better the reconstructions obtained, however, in practice, a limited number of basis vectors still provides reasonable reconstruction. The method 200 then proceeds to step 114.

Figure 6:
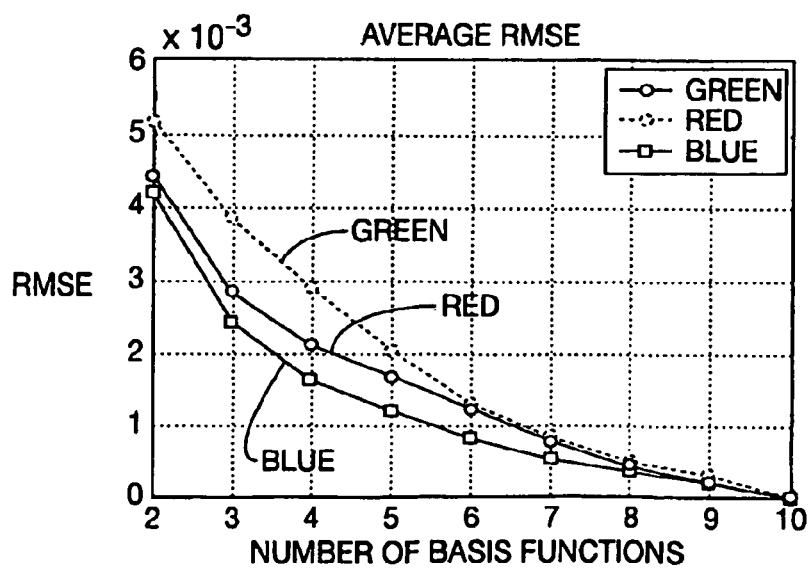
FIG. 6 depicts a plot of average root mean squared error versus a number of basis vectors or functions.

At step 114, root mean squared error (RMSE) between the originally measured gamma curves and the reconstructed gamma curves is determined. Such curves can be plotted against a number of basis vectors (basis functions) for each channel (R, G, B). For example, FIG. 6 depicts a plot of average root mean squared error versus a number of basis vectors or functions. In one embodiment, the average RMSE is used to determine if a correct or needed number of basis vectors had been correctly selected. In various embodiments of the present invention, steps 112 and 114 can be considered optional and only performed if accuracy is an issue. In yet alternate embodiments of the present invention, feedback precision checks can be performed instead of or in addition to the average RMSE method described above.

Referring back to FIG. 6, average RMSE values are depicted as a function of the number of basis functions (basis vectors) for each channel (Red, Green, Blue). The RMSE was calculated between the ten originally measured gamma curves (FIG. 5) and the ten reconstructed gamma curves with a corresponding number of basis vectors (from Eq. 1). The RMSE decreases as the number of vectors increases as expected. With only two vectors, the RMSE values can still be between 0.004~0.005 which means that the reconstruction is only 0.4~0.5% off from the original curve. As such, in one embodiment of the present invention, the number of basis vectors used can be two if accuracy is not an issue.

Figure 7:
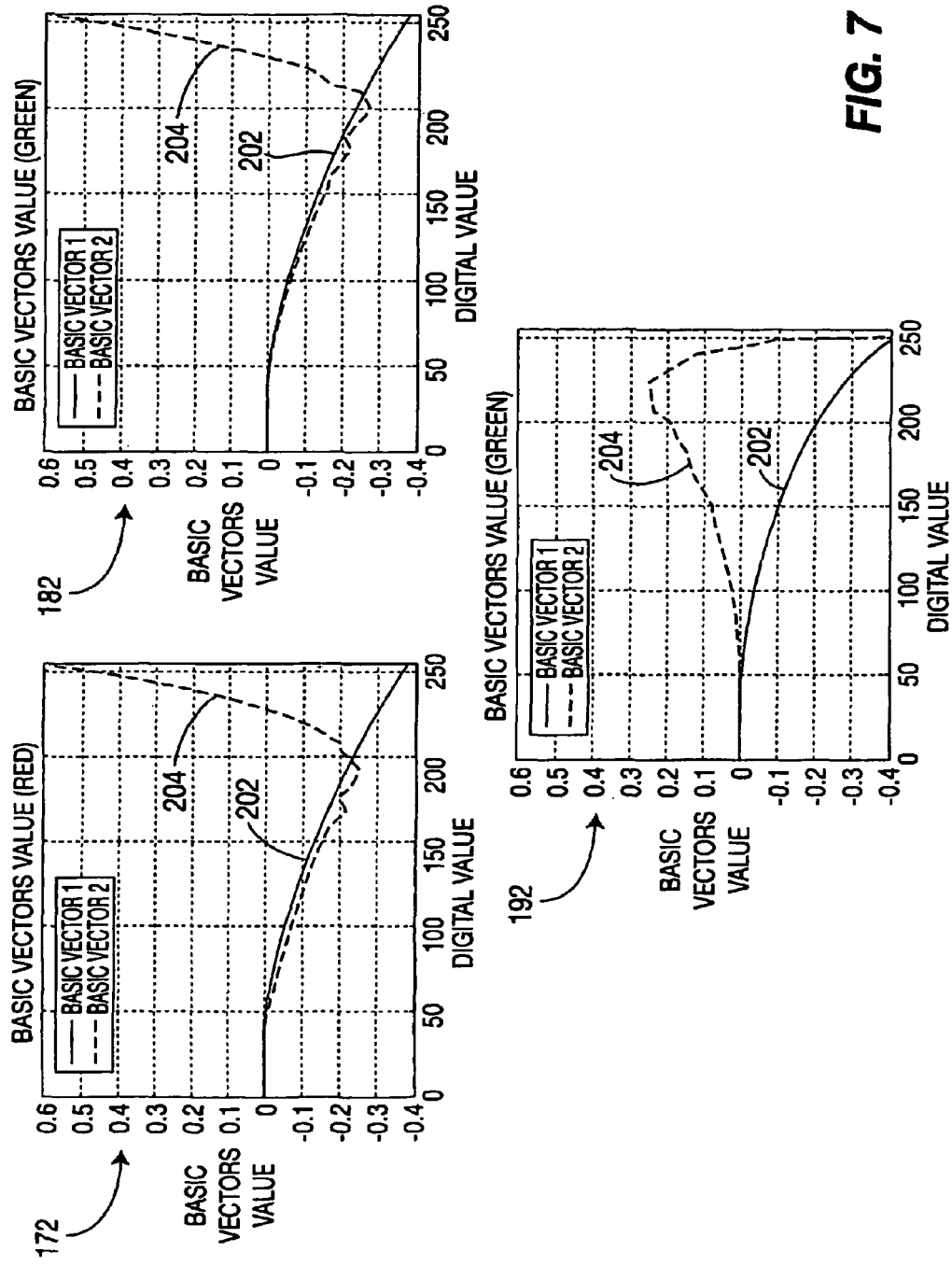
FIG. 7 depicts respective plots for basis vectors (basis functions) for each color channel.

For example, FIG. 7 depicts plots for respective basis vectors (basis functions) for each color component or channel of FIG. 6. Referring to FIG. 7, for each channel (R, G, B), in accordance with one embodiment, values of basis vectors 202 and 204 are illustratively plotted in graphs 172, 182 and 192, respectively, against digital value. The values of the basis vectors are determined from the eigenvectors of PCA.

Referring back to the method 200 of FIG. 2, the method continues at step 116. At step 116, coefficients for each of the gamma curves (the ten curves either non-normalized or normalized as desired) are determined. The PCA results in coefficients (from the eigenvalues) for each of the ten curves. In the embodiment described, two basis vectors are used each with one coefficient (two coefficients total for each curve). The method 200 then proceeds to step 118.

Figure 8:
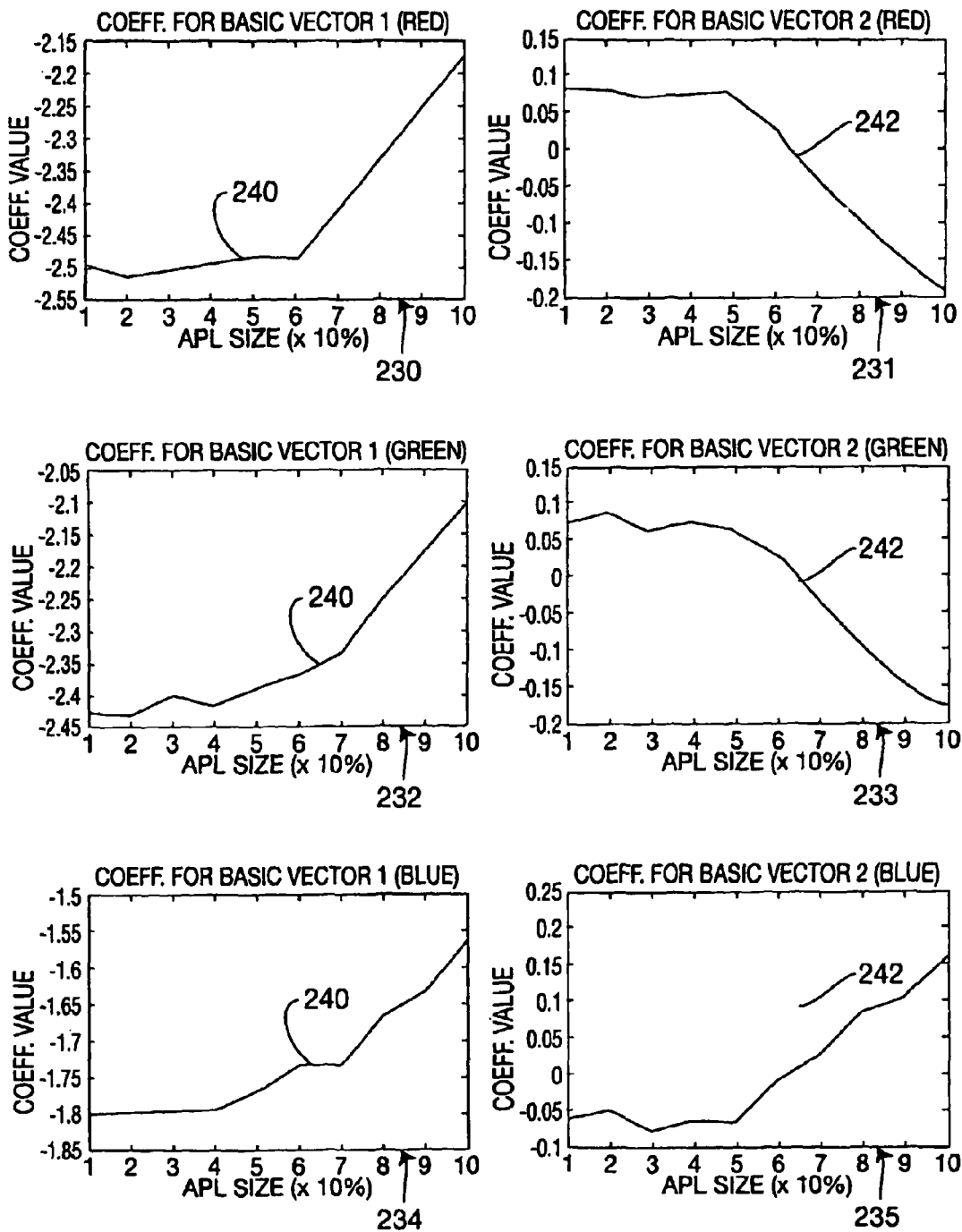
FIG. 8 depicts respective plots of coefficient values versus APL values for each color channel.

At step 118, the determined coefficients can be programmed or stored in a display device and used for adjusting luminance for different and changing APLs. For example, FIG. 8 depicts respective plots of coefficient values versus APL values for each color channel. Referring to FIG. 8, the coefficients ($C_1$ and $C_2$) for the two basis vectors are determined as a function of APL size for each channel. In one embodiment, the coefficients are determined for each of the ten predetermined APLs and plotted. In FIG. 8, coefficient curves for the two coefficients associated with the two basis vectors are shown for each channel (R, G, B). Plots for red (230, 231), green (232, 233), and blue (234, 235) depict coefficients $C_1$ and $C_2$, respectively for basis vectors $V_1$ and $V_2$. The two coefficients 240 and 242 correspond with the two basis vectors. The curves for the coefficients represent quite smooth curves (close to monotonic increase or decrease curves), so a linear interpolation method or other curve fitting method can be used to fit each curve. Interpolation as described herein also includes extrapolation. As a result, an analytical function can be provided or a look-up table obtained for coefficient values for arbitrary APL sizes. That is, once the APL of the input content is known, corresponding coefficients from FIG. 8 can be derived and the corresponding coefficients with the basis vectors can be associated, and a corresponding gamma curve using Eq. (1) can be estimated in step 120. The method 200 then proceeds to step 122.

At step 122, reconstructed gamma curves based on interpolation results are estimated and used to provide adjustment for luminance for any digital values at any APL. The gamma curves can be reconstructed in accordance with a sensed change to the APL or triggered by a User adjustment.

In one embodiment of the present invention, steps 102-116 can be referred to as characterizing a display. These steps can be performed once to determine a response of a display and then to program the display as in step 118 accordingly. Steps 120 and 122 can be performed in the field once the display is being operated by a user to adjust the characteristics of the display.

Figure 9:
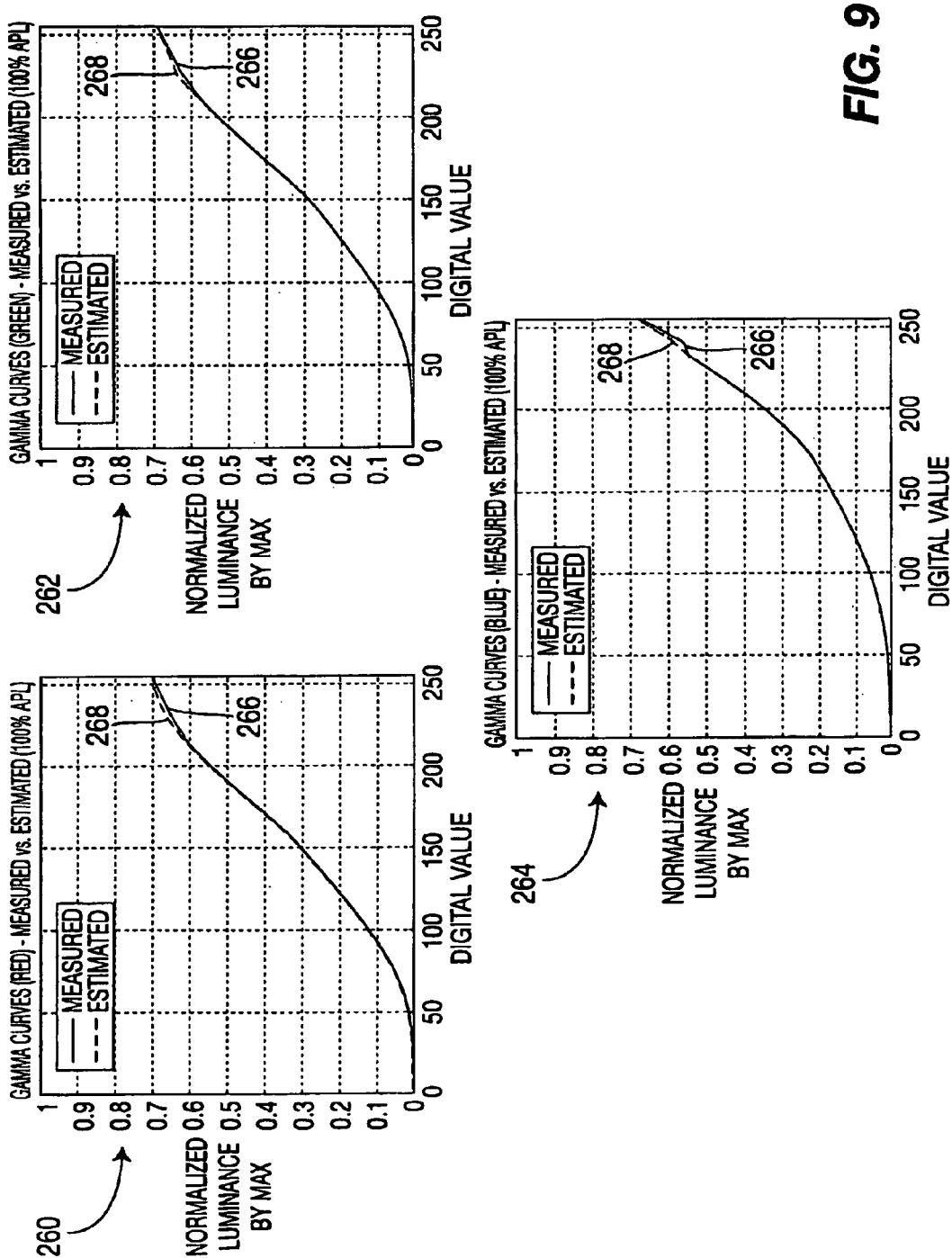
FIG. 9 depicts a comparison of gamma curves between a measured gamma curve and a reconstructed gamma curve at 100% APL.
Figure 10:
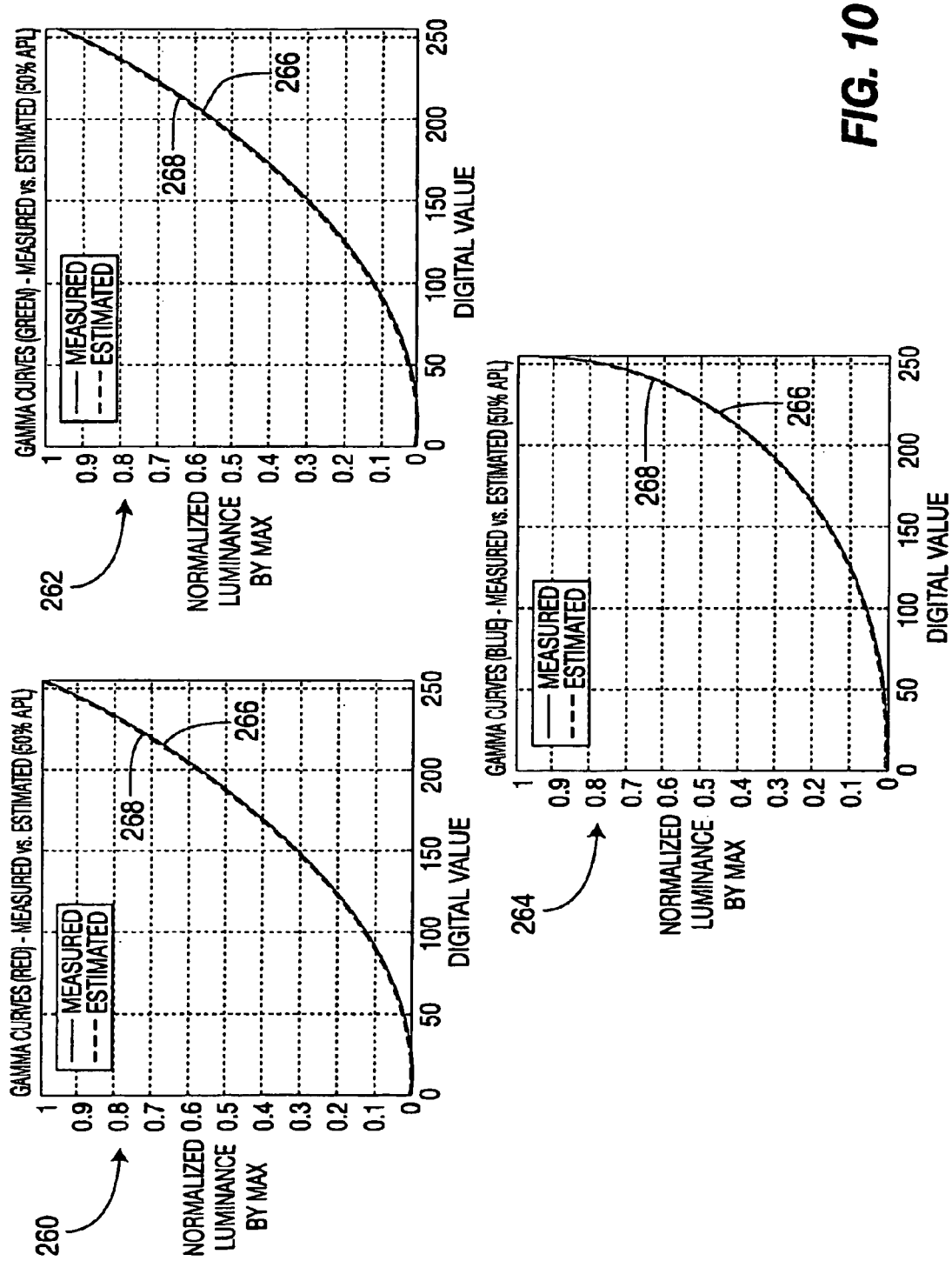
FIG. 10 depicts a comparison of gamma curves between a measured gamma curve and a reconstructed gamma curve at 50% APL.
Figure 11:
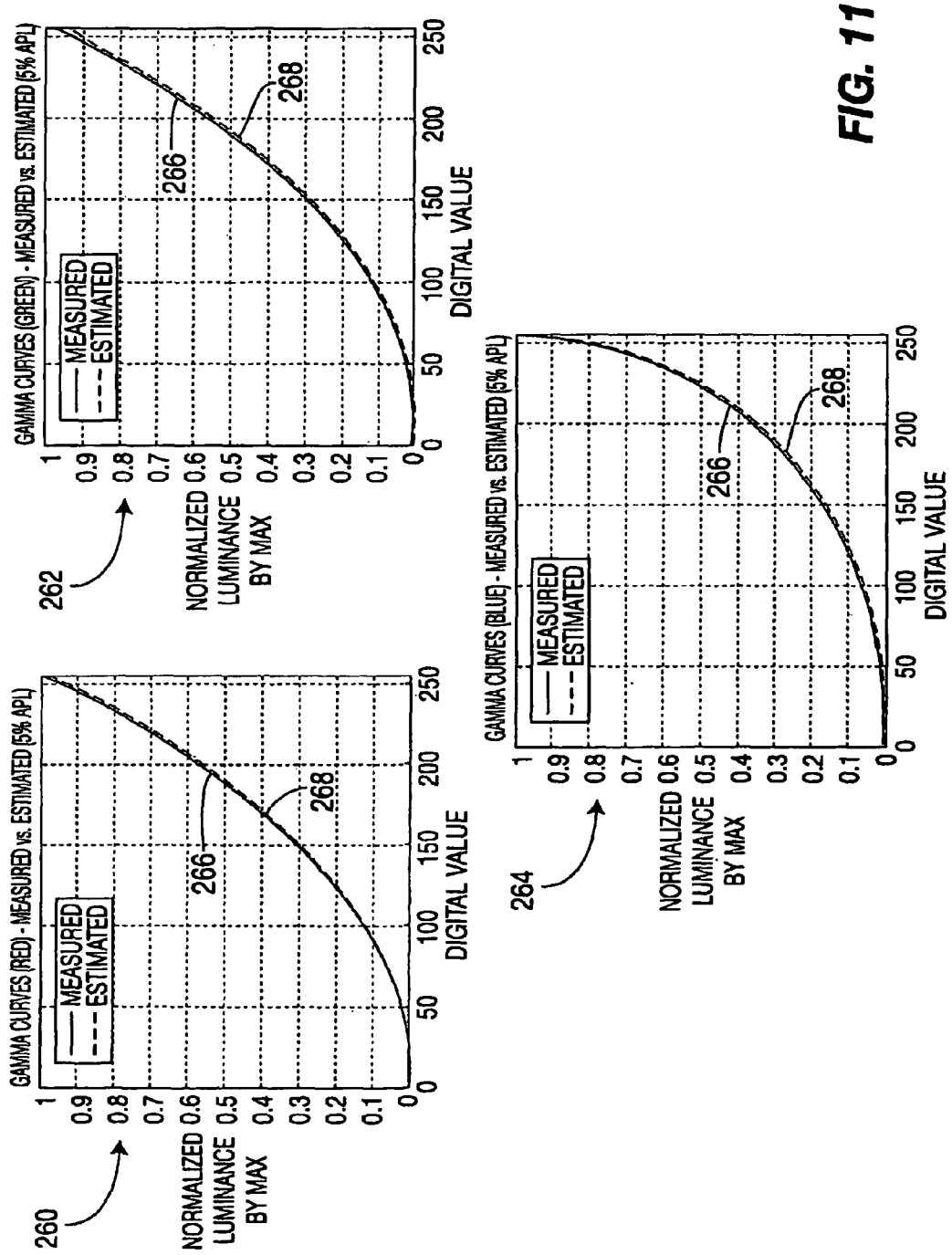
FIG. 11 depicts a comparison of gamma curves between a measured gamma curve and a reconstructed gamma curve at 5% APL using extrapolation in accordance with an embodiment of the present invention.

FIG. 9 depicts a comparison of gamma curves between a measured gamma curve and a reconstructed gamma curve at 100% APL. That is, FIG. 9 depicts exemplary reconstructed gamma curves 260, 262, 264 for red, green and blue, respectively for 100% APL. It has been observed that there is little difference between measured gamma curves 266 and reconstructed or estimated gamma curves 268. A similar comparison is depicted in FIG. 10 for 50% APL. For the further verification, the gamma curve was measured for 5% APL, and a corresponding coefficient from FIG. 8 was derived by extrapolation. Eq. (1) was also used to predict the curve 268 as depicted in FIG. 11. That is, FIG. 11 depicts a comparison of gamma curves between a measured gamma curve and a reconstructed gamma curve at 5% APL using extrapolation in accordance with an embodiment of the present invention. The very close match with the measured gamma curve 266 (RMSE was 0.005 for R, 0.0069 for G, 0.0062 for B) confirms that the method in accordance with the present principles is very precise and can be used to estimate gammas for arbitrary APL size.

Figure 12:
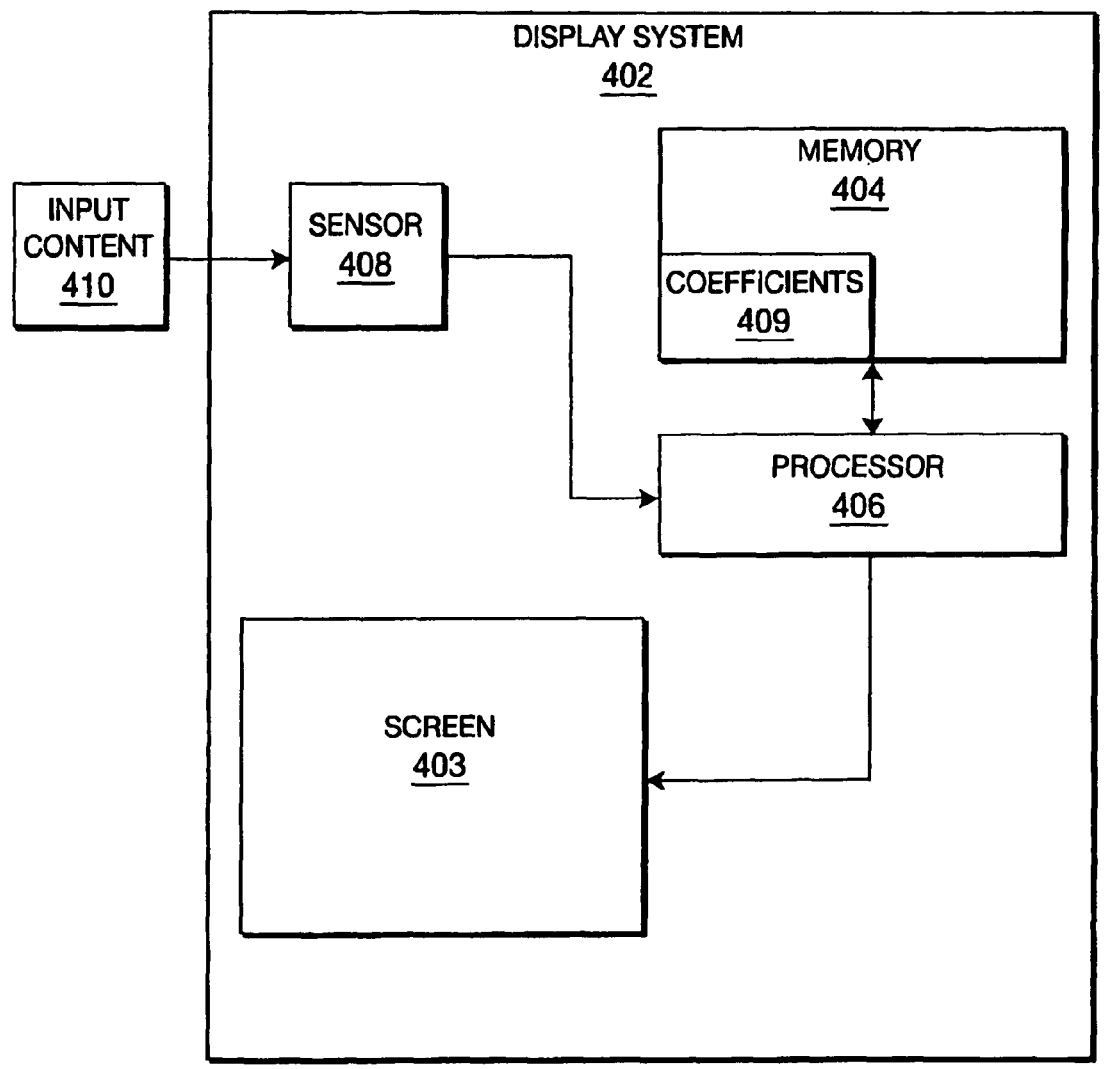
FIG. 12 depicts a high level block diagram of a system for implementing gamma prediction for a display or display system in accordance with one embodiment of the present invention.

FIG. 12 depicts a high level block diagram of a system 400 for implementing gamma prediction for a display or display system in accordance with one embodiment of the present invention. The system 400 includes a display device or display system 402 with a screen 403. The display device 402 can comprise a television, a computer monitor, a handheld display device or any other suitable display. The system 400 preferably includes a memory 404 and a processor 406. The memory 404 can include a lookup table, analytical equation, plot or other feature capable of cross referencing gamma curves or functions in accordance with APL levels. In one embodiment, the memory 404 stores or defines coefficients 409 for reconstruction calculations for gamma. The APL level can be detected by, for example, an APL (power) sensor 408. The APL sensor 408 evaluates input content to determine if the APL level changes or has been adjusted by, for example, a user. The input content is modified accordingly via the processor 406 given the APL changes. In one embodiment of the present invention, the coefficients 409 for discreet APLs stored in a look-up table or computed using an analytical equation are used to interpolate the gamma for a new APL as described above. This can be performed dynamically during operation of the display device 402.

Information can be stored in the memory 404 based on characterizations of the gamma effects at the different APLs, as described above. More specifically in one embodiment of the present invention, during the manufacture and design of a given display type, the gamma curves can be predicted according to the levels of average power in the input content. For example, assuming that the size of measurement patches on the display center is related with the APL, gammas for a plurality (in the example above, 10 APL sizes) of different APL sizes (10% to 100%) are measured using the ramp patches for each channel. As described above and in accordance with various embodiments of the present invention, a Principle Component Analysis (PCA) or other curve analysis methods can be applied to the measured ten curves to determine basis vectors and coefficients. Two (or more) basis vectors sufficient to reliably estimate the gammas are obtained. The coefficients from the PCA are then interpolated to yield coefficients for arbitrary APL sizes. The precision of the estimation to the original measurement can be determined using RMSE (e.g., within 0.5%~0.7% precision or better) for the test data (5% APL). Once the coefficients are known, the coefficients can be stored in the memory 404 to support gamma prediction and adjustment for the display device 402.

During operation, the display device 402 is used for viewing input content 410. As the APL changes occur in the input content or when adjustments are made by a user (e.g., brightness or luminance adjustments), the sensor 408 alerts the processor 406 that a change has occurred. The processor 406 then uses a look up table, equation or other means stored in the memory 404 to compute and/or interpolate a new gamma based on the APL. The input content 410 can then be adjusted by applying the new gamma values.

Having described preferred embodiments for a method and system for predicting gamma characteristics for a display (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method comprising:
measuring gamma characteristics for a plurality of average power levels of a display to determine respective gamma controlled functions based on respective gamma curves derived from measured gamma characteristics;
determining respective basis vectors and coefficients for the gamma controlled functions of the plurality of average power levels; and
during operation of the display, in response to a different average power level, interpolating between coefficients associated with known average power levels to determine a respective coefficient and gamma controlled function for the different average power level.

2. The method of claim 1, wherein gamma characteristics are measured by measuring ramp patches.

3. The method of claim 2, wherein ramp patches are measured for each color channel.

4. The method of claim 1, wherein gamma characteristics are measured for each color channel.

5. The method of claim 1, wherein said coefficients are determined using a principal component analysis function.

6. The method of claim 1, wherein said gamma curves are normalized to a common reference.

7. The method of claim 6, wherein said common reference comprises a maximum luminance level.

8. The method of claim 1, further comprising reconstructing at least one of said gamma controlled functions to determine a precision of at least one of said gamma controlled functions.

9. The method of claim 8, wherein said at least one gamma controlled function is reconstructed as a function of input content values, the determined basis vectors and the determined coefficients.

10. The method of claim 1, wherein said determined coefficients are applied to content to be displayed for adjusting luminance values of said input content to be displayed.

11. The method of claim 1, wherein determined coefficients and gamma controlled functions are stored in a memory.

12. A display system, comprising:
a display means configured to display input content;
a storage means configured to store coefficients and gamma controlled functions for a plurality of average power levels;
a sensor configured to determine when a change to an average power level has occurred or a new average power level has been received; and
a processor configured to be responsive to the sensor and, during operation of the display means, in response to a different average power level determined by said sensor, interpolating between coefficients associated with known average power levels to determine a respective coefficient and gamma controlled function for the different average power level.

13. The display system of claim 12, wherein the storage means includes a look up table for storing respective values for gammas associated with average power levels.

14. The display system of claim 12, wherein the stored coefficients are determined using a principal component analysis on the gamma controlled functions.

15. The display system of claim 12, wherein determined respective coefficients and gamma controlled functions are applied to input content having the different average power level for adjusting luminance values of the input content.

16. A display system, comprising:
a display device configured to display input content;
a memory configured to store coefficients and gamma controlled functions for a plurality of average power levels;
a sensor configured to determine when a change to an average power level has occurred or a new average power level has been received; and
a processor configured to be responsive to the sensor and, during operation of the display means, in response to a different average power level determined by said sensor, interpolating between coefficients associated with known average power levels to determine a respective coefficient and gamma controlled function for the different average power level.

17. The display system of claim 16, wherein the memory includes a look up table for storing respective values for gammas associated with average power levels.

18. The display system of claim 16, wherein the stored coefficients are determined using a principal component analysis on the gamma controlled functions.

19. The display system of claim 16, wherein determined respective coefficients and gamma controlled functions are applied to input content having the different average power level for adjusting luminance values of the input content.

* * * * *